United States Patent
Bergelin et al.

[11] Patent Number: 5,499,570
[45] Date of Patent: Mar. 19, 1996

[54] PISTON WITH PISTON ROD BEING LATCHABLE THROUGH A RETAINING MEMBER

[75] Inventors: Klaus Bergelin, Niedernhausen; Willi Hartmann, Riedstadt; Kurt Saalbach, Morfelden-Walldorf; Peter Low, Gravenwiesbach, all of Germany

[73] Assignee: ITT Automotive Europe GmbH, Germany

[21] Appl. No.: 284,633

[22] PCT Filed: Feb. 9, 1993

[86] PCT No.: PCT/EP93/00306

§ 371 Date: Nov. 17, 1994

§ 102(e) Date: Nov. 17, 1994

[87] PCT Pub. No.: WO93/15942

PCT Pub. Date: Aug. 19, 1993

[30] Foreign Application Priority Data

Feb. 14, 1992 [DE] Germany ............... 42 04 418.9
Sep. 30, 1992 [DE] Germany ............... 42 32 807.1

[51] Int. Cl.$^6$ ............... F16J 1/10; F01B 29/00; F16C 11/00
[52] U.S. Cl. ............... 92/84; 403/133; 92/128
[58] Field of Search ............... 60/547.1, 552; 91/369.1, 369.2; 92/84, 128, 187; 403/127, 133, 142, 326

[56] References Cited

U.S. PATENT DOCUMENTS

| 3,013,537 | 12/1961 | Schultz | 60/547.1 X |
| 4,878,346 | 11/1989 | Metzelfeld et al. | 92/128 X |
| 4,904,106 | 2/1990 | Love | 403/39 |
| 5,143,469 | 9/1992 | Cadeddu | 403/133 |
| 5,163,773 | 11/1992 | Denney et al. | 403/133 |
| 5,290,120 | 3/1994 | Osterfeld et al. | 92/187 X |

*Primary Examiner*—John E. Ryznic
*Attorney, Agent, or Firm*—Dykema Gossett

[57] ABSTRACT

Retaining element fixed within the piston opening which avoid any inadvertant extraction of the piston rod from the piston.

The design provides a safe and easy to assemble means for fastening the piston rod within the piston which is capable of absorbing considerable tractive forces of said piston rod through said piston.

The retaining member is preferably made of plastic material which resides between the piston rod and the piston.

14 Claims, 4 Drawing Sheets

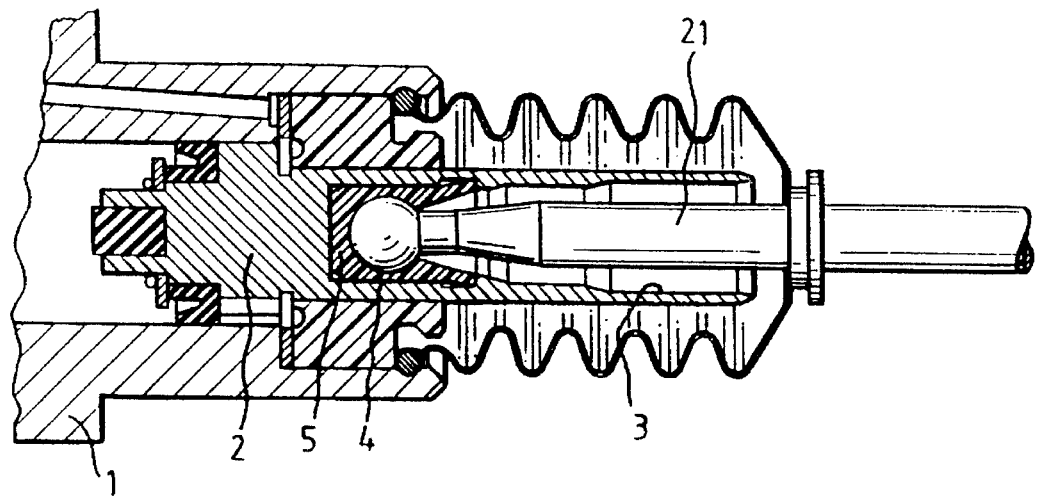
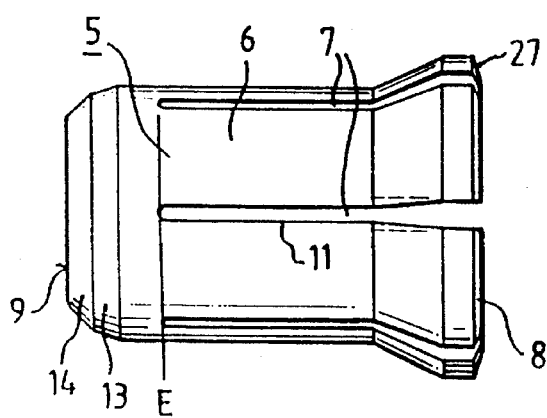
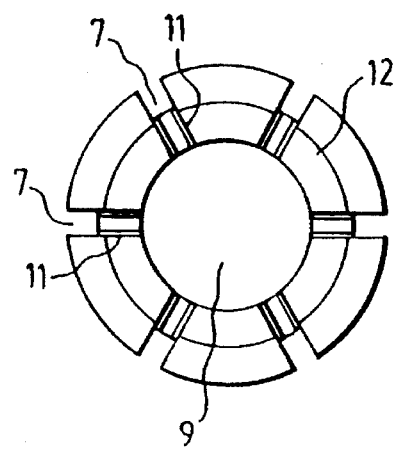
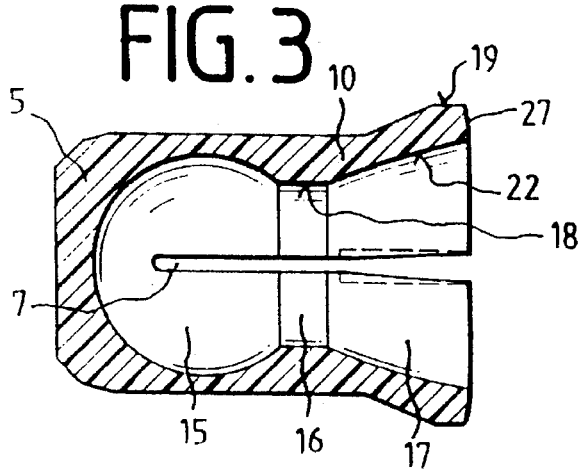

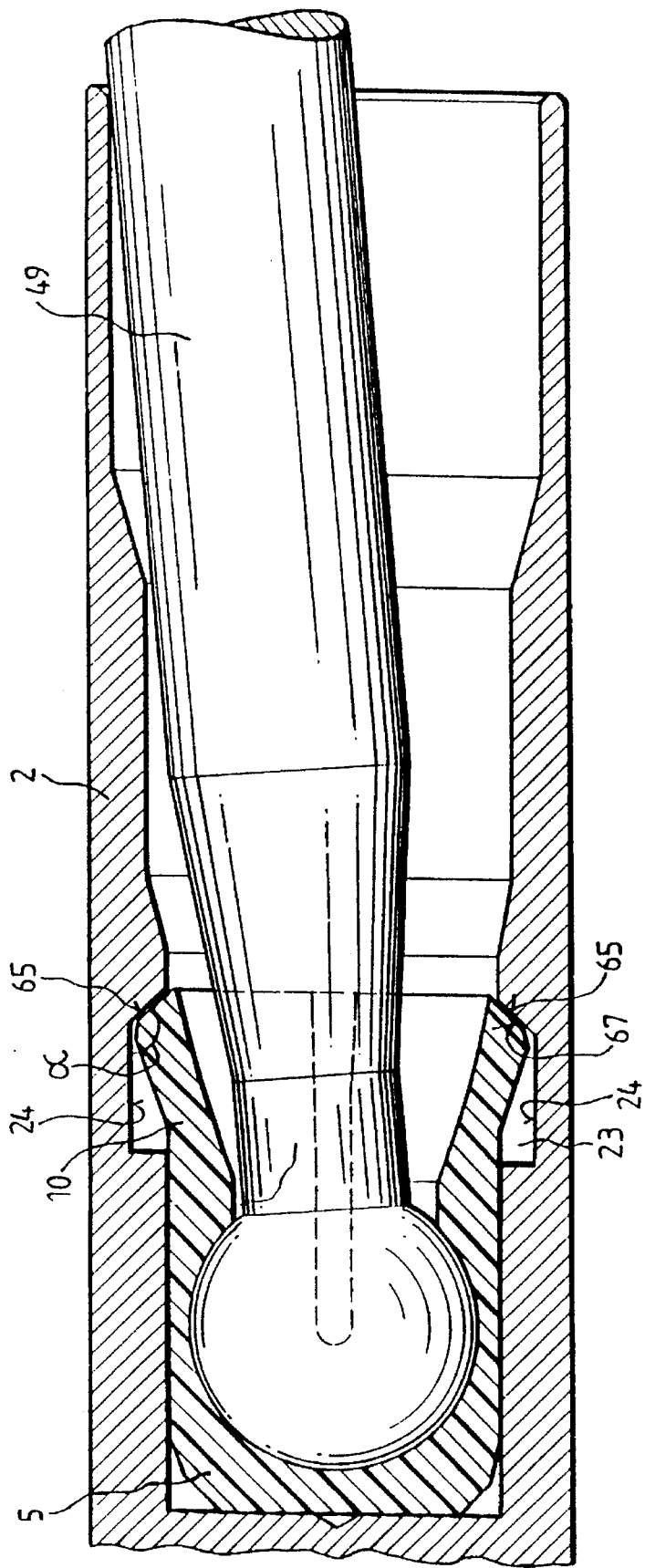

PISTON WITH PISTON ROD BEING LATCHABLE THROUGH A RETAINING MEMBER

This application is a Rule 371 of PCT/EP93/00306 filed Feb. 9, 1993.

TECHNICAL FIELD

The invention relates to pistons and more particularly relates to pistons used in the master cylinder of a vehicle brake system.

BACKGROUND OF THE INVENTION

Push rods of pistons used in vehicle brake applications are pushed into the cylinder by the actuating force of the operating person and returned into their starting position by return springs. In this context, two return springs are provided, one of which is positioned within the piston and acts directly on the piston while the other one is fixed outside the piston and returns the brake pedal into its starting position.

In master cylinders it may happen that the external spring extracts the piston rod out of the piston. To prevent separation of the rod and piston various approaches have been taken such as clips. All of these known solutions share a common drawback in of steel, retaining members in the shape of rubber rings, and undercuts in the piston in respect of the piston rod, which are formed, for example, by caulking that the known securing means do not suffice in many cases to prevent the piston rod from being moved out in the event of a sudden release of the actuating pedal. In many cases the solutions which have become state of the art are, furthermore, difficult to assemble insofar as they require additional operations when the piston rod is attached to the piston. Many times the prior-art solutions are, moreover, dependent in their securing action on the angular position the piston rod assumes at each moment in respect of the longitudinal axis of the piston.

An object of the present invention is to create an inexpensive securing means which reliably latches the rod within the piston and resists sizable extracting forces (independent of the angular position of the piston rod).

SUMMARY OF THE INVENTION

The present invention consists of a retaining member which seats on the piston rod and which is formed with latching noses which grip behind matching undercuts within the interior space of the piston when the piston rod is introduced into the piston. The retaining member is configurated such that in the latched condition the latching noses remain largely compressed, as a result the projections in the piston-rod opening of the retaining member are held with a position shifted radially inwardly and thus retain a matching attachment at the piston rod. In this way, a double function of the latching noses of the retaining member is realized insofar as, on one hand, they prevent a moving-out of the retaining member itself with the piston rod in axial direction while simultaneously by the radial abutment of the latching noses against the inside wall of the piston the securing projections of the retaining member are stably maintained in engagement with the matching attachment at the piston rod.

The retaining member is preferably made of plastic material because such sophisticated shapes easily lend themselves to be manufactured at low cost and because such plastics offer the necessary elasticity for the retaining noses and for the projections moving against one another. Accordingly, in the course of the assembly first of all the latching retaining member must be pushed over the end of the push rod or piston rod, respectively, whereby the projections are swivelled in the open direction due to the penetrating attachment of the piston rod. Subsequently, said projections will return radially inwardly into their starting position because of the elasticity of the latching noses. Due to the subsequent pushing-in into the piston of the retaining member (including the end of the push rod seated within member), the latching noses will be compressed still further in the radial direction within the piston opening as they pass through the blind-end bore. After having passed the undercuts they will move back outwardly into their starting position sufficiently so as to abut against the internal generated surface of the piston which is disposed radially within the unstressed swivelling position of the latching noses.

The closed end of the retaining member serves simultaneously for the transmission of thrust forces to the piston. The hollow-cone shape of the end at the retaining member allows it to be cast with comparative ease. In this procedure attention attention must be directed to the slots forming the latching noses have a suitable length. On one hand, they must not be so long that on account of sufficient pulling-out forces they bend sharply outward, as a result whereof the attachment of the push rod would allow it to be extracted between the projectons of the retaining member. On the other hand, they must not, be too short, since they must own a sufficient elasticity so that they do not break away at the moment of the introduction of the retaining member into the piston and previously at the moment the push rod is introduced into the retaining member.

Because the piston rod is to be swingable in respect of the piston and is to secure the latter against extracting forces equally well in any swivelling position, the latching noses are preferably uniformly distributed over the circumference of the retaining member.

The retaining member is preferably furnished with first and second cavities. The second cavity preferably has the shape of a truncated core having a small and a large diameter. This shape is suited for the accommodation of a push rod with a ball-shaped end. The second diameter must in this connection be so wide that a sufficient spreading-apart of the latching noses is possible in the event of the introduction of the ball-shaped end of the push rod without the latching noses breaking away. As already explained herein before also the length of the slots utilized, the selection of the plastic material, and the wall thickness at the individual ranges of the retaining member have a decisive influence in this regard.

The projections must reach sufficiently far radially inwardly in the latched condition of the retaining member so that they are capable of firmly retaining the preferably ball-shaped head of the push rod against elevated extracting forces. In this context, it will, indeed, be helpful for the retaining member that, as is mentioned herein above, in the assembled condition the latching noses are pressed inwardly by the piston walls and so close the ball-shaped first cavity relatively snugly around the head-shaped rod end, whereby the walls strongly limit the movement of the latching noses in the range of the projections.

By the bevelling of the outer contour of the latching noses, a relatively large surface of abutment of the latching noses with the generated surface of the piston bore is obtained in the assembled condition of the retaining members as a result whereof the elasticity of the retaining noses in the retaining condition is reduced still further.

By using bevels, the outer contour of the retaining member is roughly approximated at its closed end to the spherical shape of the interior space. In the presence of a simple-design configuration of the casting mould a greater uniformity of the wall thickness is attained. At the same time, it is prevented that the retaining member might strike with its circumferential front edge against a circumferential butt edge at the bottom of the accommodating bore of the piston. A greater precision of location of the retaining member within the piston will be achieved in this way.

In particular, the present invention renders it possible to forego a stop in respect of the return movement of an actuating pedal, since this stop effect can be realized by the retaining member.

Additionally, the present invention provides an inventive piston unit with a power booster. This may be constituted by a brake power booster which is coupled to a master cylinder. A spring which is disposed within the master cylinder and which retracts the piston will then allow to be foregone and, thus, the overall length of the master cylinder will allow to be reduced by the block length of the spared spring. In this conjunction, the function of the spring may be performed by a spring which is fixed outside the master cylinder, in particular by a spring of the brake power booster. If and when a tandem master cylinder is used a first spring actuating the floating piston will allow to be utterly done without, whereas a second spring which is fixed between the floating piston and the push rod piston is dimensioned with a spring power which is reduced by the spring power of said first spring, by which the overall length is additionally reduced.

In this case the floating piston will have to be coupled in a non-positive engagement to a stop bushing which is in connection with the push rod piston by means of a captivating element in order to ensure the retraction of the floating piston.

Since it is desirable that the brake power booster is detachable from the master cylinder, the retaining member is preferably fixed within the piston in such a manner that the possibility of inadvertant disassembly is safeguarded. In this context, in the event of axial forces which are never exceeded during the operation of a braking system (generally maximum 200N to 500N) the retaining member should remain to be clamped within the piston, whereas in the event of greatly higher forces it should allow to come detached and be moved out of the piston without damage, for example by unlatching.

BRIEF DESCRIPTION OF THE DRAWINGS

The following two embodiments will be described making reference to the accompanying drawings:

FIG. 1 shows a section of a master cylinder or of another hydraulic cylinder, such as, for example, a master brake cylinder, a tandem master cylinder or the like.

FIG. 2 shows an inventive retaining member in a lateral view and upscaled representation.

FIG. 3 shows a retaining member according to FIG. 2 in a cross-sectional representation.

FIG. 4 shows the retaining member in FIG. 2 in a top view.

FIG. 7 shows the retaining member and latching groove in a detachable version, upscaled section as in FIG. 5.

DETAILED DESCRIPTION OF THE PREFERRED EMBODIMENTS

Figure 5:
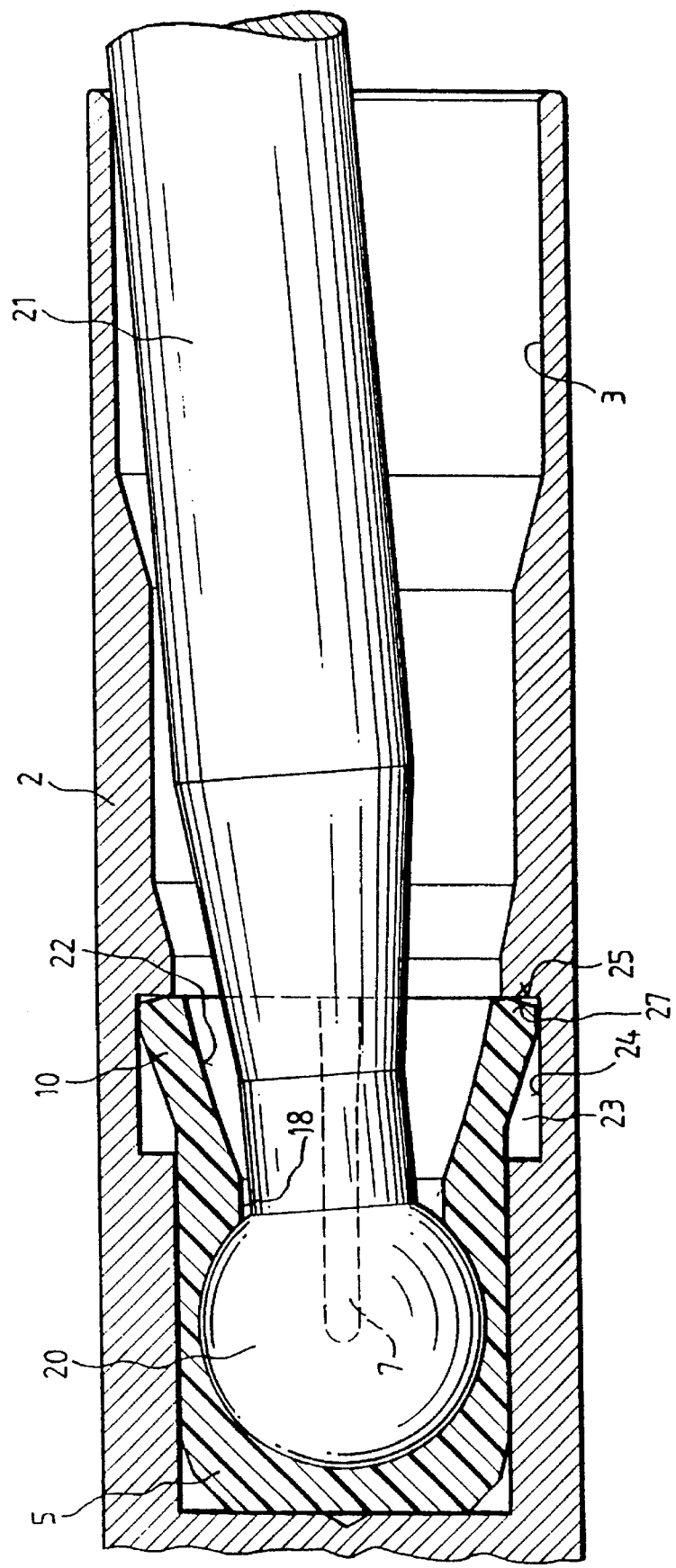
FIG. 5 shows in a still more upscaled representation a piston rod which is incorporated in the retaining member in a swivelled position, the piston rod and the surrounding piston being shown only in part.

In FIG. 1 only the components are described as far as they are essential for the invention. Those components which are customary in master cylinders, such as sealing cups and protecting cups, circlips, etc., will not be explained in more detail in this instance.

FIG. 1 shows a cylinder 1 within which a piston 2 is sealedly guided. The piston 2 is formed with a stepped blind-end bore 3 in whose bottom section 4 the retaining member 5 is inserted. As will be appreciated from FIG. 2, the retaining member is substantially composed of a cylindrical section 6 and of a conical section 12, said section 12 having substantially the shape of a truncated cone. FIG. 3 shows that the retaining member 5 is a hollow body, slots 7 extending in the longitudinal direction of the retaining member 5. Slots 7 run from the open end 8 of the retaining member in the direction of its closed end up to an imaginary plane E. By the length of the slots 7 the elasticity of the latching noses 10 formed by the slots 7 is largely determined. The lateral surfaces 11 of the latching noses 10 are determined by the radially extending surfaces of the slots 7.

At the closed bottom 9 of the retaining member 5 a first bevel 13 and a second bevel 14 are positioned one behind the other, which by means of a simple-design configuration approximate to a comparatively large radius so that the front face of the bottom 9 can firmly abut against the bottom of the bottom section 4 of the blind-end bore 3.

FIG. 3 shows the interior space of the retaining member which comprises a first cavity 15 having substantially the shape of a spherical segment. The first cavity 15 passes over into a cylindrical recess 16. The latter is succeeded by a second cavity 17 which has substantially the shape of a truncated cone. The generated surface of said cylindrical recess 16 is formed by radially inwardly jutting projections 18 of the latching noses 10.

FIG. 3 shows, in addition, annular segment-shaped sections 19 of the outer contour of said latching noses 10 which determine a larger abutment surface of said latching noses 10 against the blind-end bore 3.

As to its function, the first cavity 15 surrounds a matchingly shaped, substantially spherical attachment 20 (pl.s. FIG. 5) of the piston rod 21. In this configuration, the projections 18 prevent the piston rod 21 from sliding out of the retaining member 5. The conical inside walls 22 of the latching noses 10, furthermore, afford a swivelling movement of the piston rod 21.

As is visible in FIG. 5, the stepped blind-end bore 3 is furnished, in its front, closed range, with a circumferential radial groove 23, the latching noses 10 taking support in radial direction at the circumferential generated groove surface 24, whereas the undercut 25 which points toward the bottom of the blind-end bore 3 takes care of giving support to the latching noses 10 in axial direction.

For the purpose of assembly, the ball-shaped attachment 20 of the piston rod 21 is pushed into the first cavity 15 of the retaining member 5. During this operation, the latching noses 10 will, at the moment of the contour of the ball-shaped attachment 20 passing through the projections 18, be bent radially outwardly on account of the effect of the slots 7. After the ball-shaped attachment 20 has been accommodated by the first cavity 15, the projections 18 and, as a consequence, the latching noses 10 will largely return into their original position. Subsequently the unit comprised of the piston rod 21 and the retaining member 5 is pushed into the stepped blind-end bore 3 until the open end 8 of said retaining member 5 passes the undercuts 25 of the radial groove 23 so that the latching noses 10 are allowed to move radially outwardly. In this manner, the retaining member 5 jointly with the piston rod 21 will result to be captivated within the blind-end bore 3. The radial abutment of the latching noses 10 with the generated groove surface 24 stiffens the elasticity of the latching noses 10 at the level of the projections 18 so that said projections 18 will be capable of absorbing considerable tractive forces of the piston rod 21.

The configuration of the rear abutment surface 27, too, which is chamfered in radial direction toward the centre line, particularly rounded off, is highly advantageous with regard to the mode of operation of the retaining member 5. In this connection, the radius of curvature may, for instance, be the distance from the ball center of the spherical first cavity up to the abutment surface 27. Other embodiments include smaller radii. As to the rounding-off or chamfer the major advantage is that during the movement of the latching noses 10 radially outwardly the rounded-off, chamfered abutment surface 27 sliding onto the undercut 25 resist a force at the retaining member 5 which is directed toward the bottom 9 and which safeguards a firm abutment between said bottom 9 according to FIG. 2 and the matching abutment surface of the piston 2 (FIG. 1). In this way, inaccuracies will allow to be compensated in an easy manner insofar as the latching noses 10 will move sufficiently radially outward until the retaining member 5 comes to be firmly clamped and latched in axial direction in respect of the piston 2.

For the mode of operation of the retaining member 5, the number of the latching noses 10 is of importance. The elasticity of the retaining member increases as the number of the selected latching noses 10 increases. In this conjunction, it has proved expedient in practice to choose six slots 7 for the formation of the latching noses 10 and of the number of latching noses 10 resulting therefrom, as in that case the retaining member 5 is, on one hand, sufficiently elastic while, on the other hand, it retains the necessary rigidity to prevent any extraction.

Figure 6:
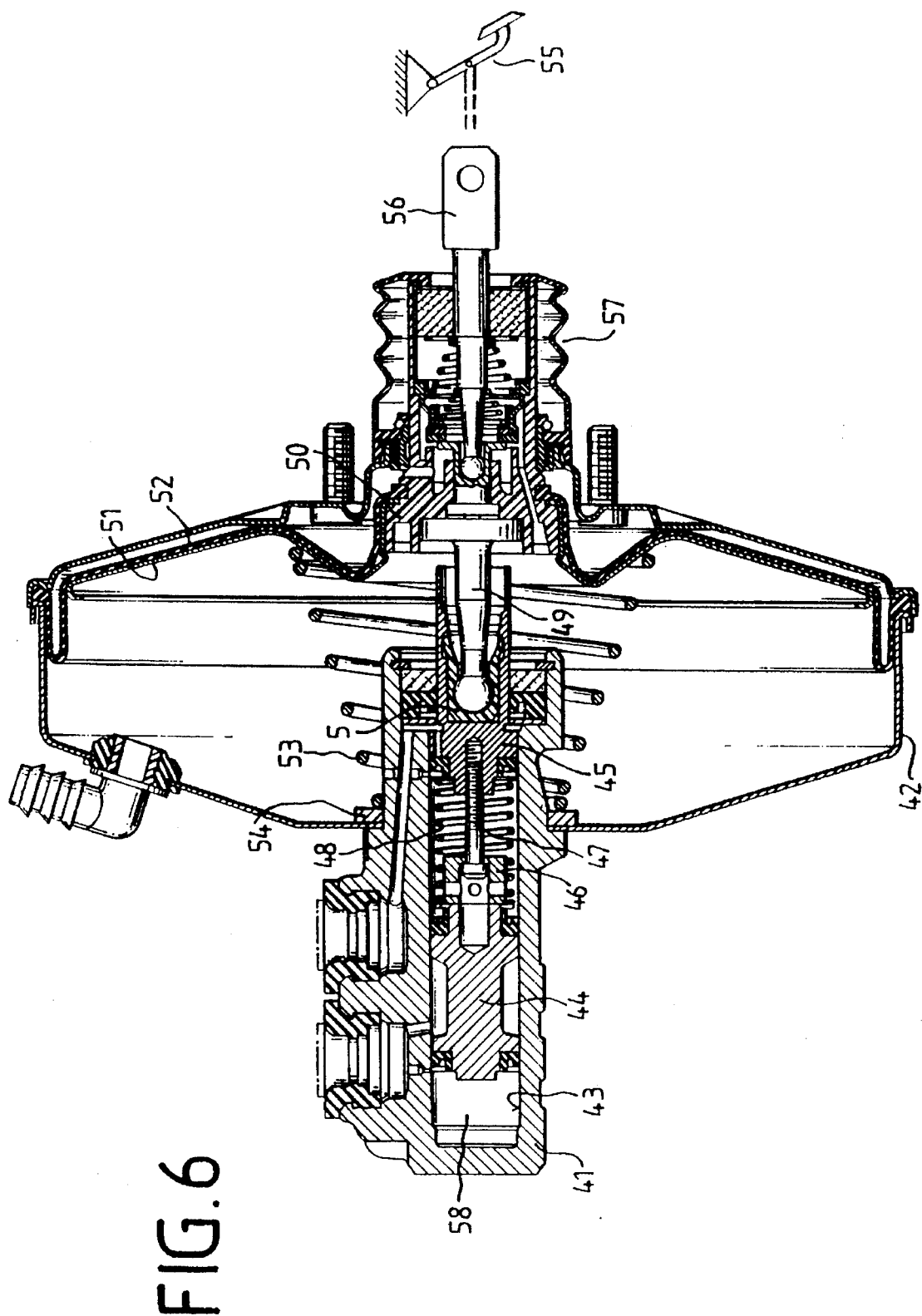
FIG. 6 shows a brake power booster which is inventively coupled to a tandem master cylinder.

FIG. 6 shows a tandem master cylinder 41 to which a vacuum brake power booster 42 is coupled. The components of said tandem master cylinder 41 and of said vacuum brake power booster 42 as well as their functioning are not dealt with except as they are important to the invention.

Within a bore 43 of the tandem master cylinder 41, a floating piston 44 and a push rod piston 45 are guided. At the floating piston 44 a stop bushing 46 is fixed in non-positive engagement within which a captivating element 47 is coupled to said push rod piston 45. Captivating element 47 can move axially between two extreme positions. Between the floating piston 44 and the push rod piston 45 a spring 48 is disposed which is subject to a prestress and which urges apart the pistons 44, 45.

Through the retaining member 5 the push rod piston 45 is coupled to the output member 49 of the vacuum brake power booster 42, which former is fixed, in its turn, without play to the valve piston 50 of the vacuum brake power booster 42.

To the valve piston 50, the power piston 51 and the diaphragm 52 are fixed. The piston return spring 53 of the vacuum brake power booster 42 takes support at the tandem master cylinder 41 through the fixation element 54 of the latter and to the power piston 51. When a force which is brought to bear on an actuating pedal 55 is transmitted to the valve piston 50 through a transmission member 56, then the valve arrangement 57 of the vacuum brake power booster 42 will act such in prior-art manner that on the righthand side of the power piston 51 as viewing the drawing a higher pressure will build up than that existing on its lefthand side so that the power piston 51 and jointly with it the output member 49 and the push rod piston 45 will move to the left.

The procedure of the building-up of the brake pressure within the tandem master cylinder 41 takes place in prior-art manner.

When the actuating pedal 55 is released the power piston 51 of the vacuum brake power booster 42 will in prior-art manner be moved to the right again, whereby it will drag along with it the output member 49 which is coupled to it without play. The push rod piston 45, too, which is coupled to the output member 49 through the retaining member 5, will be dragged to the right, the forces of maximum 200N to 500N, which customarily occur, ranging beneath the maximum force which is safely retained by the retaining member 5.

The retraction of the floating piston 44 takes place by the interaction of the spring 48 and the captivating element 47, the captivating element 47 taking care that both the push rod piston 45 and the floating piston 44 come to be disposed in their extreme righthand position when the actuating pedal 55 is not operated. In conventional tandem master cylinders this is obtained by the spring 48 and by an additional second spring which is accommodated within the lefthand pressure chamber 58. In the embodiment under review the latter spring is not used, its function is performed by the piston return spring 53 of the vacuum brake power booster 42. Because it will not have to overcome the friction of the floating piston 44 and not overcome the power of the spared second spring, spring 48 may be dimensioned weaker. As a result of this, the overall length of the tandem master cylinder 41 is reduced by the block length of the spared spring and by the block length of the spring 48 corresponding to the spring power spared.

FIG. 7 shows the same section as FIG. 5, in this instance in a design version which is suitable for disassembly purposes, such as is, for example, applied for the connection of the tandem master cylinder 41 and the vacuum brake power booster 42 in FIG. 6.

In this configuration, the radial groove 23 of the piston 2, 45 is furnished with a bevelled flank 65 which, thus, forms a truncated cone-shaped range of said radial groove 23. The angle which is formed in an axial cross section of the generated groove surface 24 and the flank 65 is an obtuse angle, it rates 135 degrees in the embodiment under review.

The rear abutment surfaces 67, too, of the latching noses 10 are chamfered, precisely speaking, in such a manner that in the assembled condition of the retaining member 5 they come to smoothly abut against the flank 65.

As a result, it is safeguarded that the retaining member 5 will safely retain in the event of tractive forces being brought to bear as long as these forces do not exceed a maximum value of F=200N to 500N and that, on the other hand, it allows to be detached from the radial groove 23 without damage when considerably higher forces come to act, which are exerted for the disassembly of the tandem master cylinder 41 and the vacuum brake power booster 42 from each other.

LIST OF REFERENCES 1 cylinder
2 piston
3 blind-end bore
4 bottom section
5 retaining member
6 cylindrical section
7 slots
8 open end
9 bottom
10 latching nose
11 lateral surface
12 conical section
13 bevels
14 bevels
15 first cavity
16 cylindrical recess
17 second cavity
18 projections
19 annular segment-shaped section
20 attachment
21 piston rod
22 conical inside wall
23 radial groove
24 generated groove surface
25 undercut
26 front face
27 abutment surface
30 recess
41 tandem master cylinder
42 vacuum brake power booster
43 bore
44 floating piston
45 push rod piston
46 stop bushing
47 captivating element
48 spring
49 output member
50 valve piston
51 power piston
52 diaphragm
53 piston return spring
54 fixation element
55 actuating pedal
56 transmission member
57 valve arrangement
58 pressure chamber
65 flank
67 abutment surface
E gedachte Ebene=imaginary plane
F Kraft=force

We claim:

1. A piston assembly for hydraulic cylinders of automotive vehicles, in which a piston rod is swivellingly fixed to said piston assembly, comprising:

a piston having a recess, and undercuts in said recess, an elastic retaining member which is fixed to said piston rod wherein said retaining member is formed by a hollow body which is formed with projections which grip behind an attachment at the end of the piston rod, and wherein said retaining member further includes resilient latching noses which reside within said undercuts in the piston, wherein a plurality of circumferential bevels are provided along an outside surface of said cylindrical section, wherein said bevels have a different inclination which increases toward a bottom portion of said cylindrical section.

2. A piston unit as claimed in claim 1 wherein said retaining member is provided with a cylindrical section furnished with a closed bottom which passes over into a conical section at its open side, and in that slots are provided which extend alongside the conical section up into the cylindrical section and which form the latching noses.

3. A piston unit as claimed in claim 1, wherein said latching noses are uniformly distributed over the circumference of the said retaining member.

4. A piston unit as claimed in claim 1, wherein said retaining member is furnished with a first cavity which has the shape of a spherical segment, which passes over into a cylindrical recess, and which is succeeded by a second cavity which has the shape of a truncated cone having a smaller and a larger diameter, said smaller diameter corresponding to the diameter of the said cylindrical recess and said large r diameter being at least as large in the unstressed condition as the diameter of the said first cavity.

5. A piston unit as claimed in claim 1, wherein said slots extend beyond an imaginary plane which is vertical to an axis of symmetry of the said retaining member and which extends through the center of an imaginary ball which is defined by the said first cavity.

6. A piston unit as claimed in claim 1, wherein ends of the latching noses are formed with an annular segment-shaped section.

7. A piston unit as claimed in claim 1, wherein said cylindrical section is provided at its outside with a plurality of circumferential bevels having a different inclination which increases toward the said bottom.

8. A piston unit as claimed in claim 1, wherein said latching noses are formed with abutment surfaces which engage the undercuts and which are bevelled.

9. A piston unit as claimed in claim 8, wherein said abutment surfaces are rounded off circular arc-shaped.

10. A piston unit as claimed in claim 1, wherein said hydraulic cylinder is preceded by a power booster whose output power is transmitted to the piston rod.

11. A piston unit as claimed in claim 1, wherein said retaining member is fixed within the said piston.

12. A piston unit as claimed in claim 11, wherein said undercut is configured in the shape of a circumferential radial groove whose flank facing away from the retaining member is obliquely flattened, and wherein the inclination of the flank corresponds to the inclination of an abutment surface which is configurated at the end of the retaining member.

13. A piston unit as claimed in claim 1, wherein said retaining member consists of plastic material.

14. A piston assembly for hydraulic cylinders of automotive vehicles, in which a piston rod is swivellingly fixed to said piston assembly, comprising:

a piston having a recess and under-cut in said recess, any elastic retainer member which is fixed to said piston rod, wherein said retaining member is formed by a hollow body which is formed with projections which grip behind and attachment at the end of the piston rod, and wherein said retaining member further includes resilient latching noses which reside within the under-cut in the piston, wherein said retainer member is fixed within the piston, and wherein said under-cut is configured in the shape of a circumferential radial groove whose flank facing away from the retaining member is obliquely flattened, and wherein the inclination of the flank corresponds to the inclination of an abutment surface which is configured at the end of the retaining member.

* * * * *

UNITED STATES PATENT AND TRADEMARK OFFICE
CERTIFICATE OF CORRECTION

PATENT NO. : 5,499,570
DATED : March 19, 1996
INVENTOR(S) : Bergelin

It is certified that error appears in the above-indentified patent and that said Letters Patent is hereby corrected as shown below:

Column 8, line 22, please delete the space between "large" and "r" to form the word --larger--.

Signed and Sealed this

Thirteenth Day of May, 1997

Attest:

Attesting Officer

BRUCE LEHMAN

Commissioner of Patents and Trademarks